United States Patent
Kormanyos

[11] Patent Number: 6,045,358
[45] Date of Patent: *Apr. 4, 2000

[54] FORCED CONVECTION HEATING APPARATUS AND PROCESS FOR HEATING GLASS SHEETS THEREWITHIN

[75] Inventor: Kenneth R. Kormanyos, Sylvania, Ohio

[73] Assignee: Glasstech, Inc., Perrysburg, Ohio

[ * ] Notice: This patent is subject to a terminal disclaimer.

[21] Appl. No.: 09/101,571

[22] PCT Filed: Jan. 19, 1996

[86] PCT No.: PCT/US96/00766

§ 371 Date: Jul. 13, 1998

§ 102(e) Date: Jul. 13, 1998

[87] PCT Pub. No.: WO97/26496

PCT Pub. Date: Jul. 24, 1997

[51] Int. Cl.[7] .......................................... F27B 9/10
[52] U.S. Cl. ........................... 432/145; 432/136; 65/111; 65/273
[58] Field of Search ..................... 432/121, 136, 432/144, 145; 65/111, 182.2, 273

[56] References Cited

U.S. PATENT DOCUMENTS

| | | |
|---|---|---|
| 3,048,383 | 8/1962 | Champlin . |
| 3,508,899 | 4/1970 | Ward . |
| 3,637,362 | 1/1972 | Oelke et al. . |
| 4,047,919 | 9/1977 | Oelke et al. . |
| 4,144,045 | 3/1979 | Starr . |
| 4,529,380 | 7/1985 | McMaster ............................... 432/144 |
| 4,591,517 | 5/1986 | Whipple et al. . |
| 4,738,705 | 4/1988 | McMaster . |
| 4,755,204 | 7/1988 | Boardman et al. . |
| 4,764,196 | 8/1988 | Boutier et al. . |
| 4,802,904 | 2/1989 | Boutier et al. . |
| 4,853,019 | 8/1989 | Blank et al. . |
| 4,904,533 | 2/1990 | McMaster . |
| 4,997,364 | 3/1991 | McGrath et al. . |
| 5,078,775 | 1/1992 | Maltby, Jr. et al. . |
| 5,079,931 | 1/1992 | Lehto et al. . |
| 5,085,580 | 2/1992 | Reunamaki ............................ 432/152 |
| 5,094,678 | 3/1992 | Kramer et al. . |
| 5,110,338 | 5/1992 | McMaster . |
| 5,112,220 | 5/1992 | Wimberger et al. . |
| 5,150,534 | 9/1992 | Kramer . |
| 5,209,767 | 5/1993 | Maltby, Jr. et al. . |
| 5,443,382 | 8/1995 | Tsurumi et al. . |
| 5,669,954 | 9/1997 | Kormanyos . |
| 5,672,191 | 9/1997 | Kormanyos . |
| 5,735,924 | 4/1998 | Kormanyos . |
| 5,746,799 | 5/1998 | Kormanyos . |
| 5,762,677 | 6/1998 | Kormanyos . |
| 5,792,232 | 8/1998 | Kormanyos . |

FOREIGN PATENT DOCUMENTS

| | | |
|---|---|---|
| 0 649 821 A1 | 10/1993 | European Pat. Off. . |
| 40 10 280 A1 | 10/1991 | Germany . |

*Primary Examiner*—Denise L. Ferensic
*Assistant Examiner*—Gregory A. Wilson
*Attorney, Agent, or Firm*—Brooks & Kushman P.C.

[57] ABSTRACT

A forced convection heating apparatus and process for heating glass sheets therewithin includes a housing (200) having an interior region, a conveyor for conveying the glass sheets through the interior region of the housing (200), a gas burner (204) operably associated with the housing (200) for producing hot combustion gases, thereby providing a heat input to the apparatus. An adjustor (210) is operably connected to, and controls, the inputs to the gas burner (204) to vary the heat input, and, thereby, maintain the temperature of the working fluid at a preselected set point. At least one velocity control for controlling the impingement velocity of the working fluid onto the top and/or bottom surfaces of the glass sheet is also provided. The impingement velocity, and thereby the rate of convective heat exchange between the working fluid and the glass sheet, is controlled independently of the heat input to the apparatus.

23 Claims, 6 Drawing Sheets

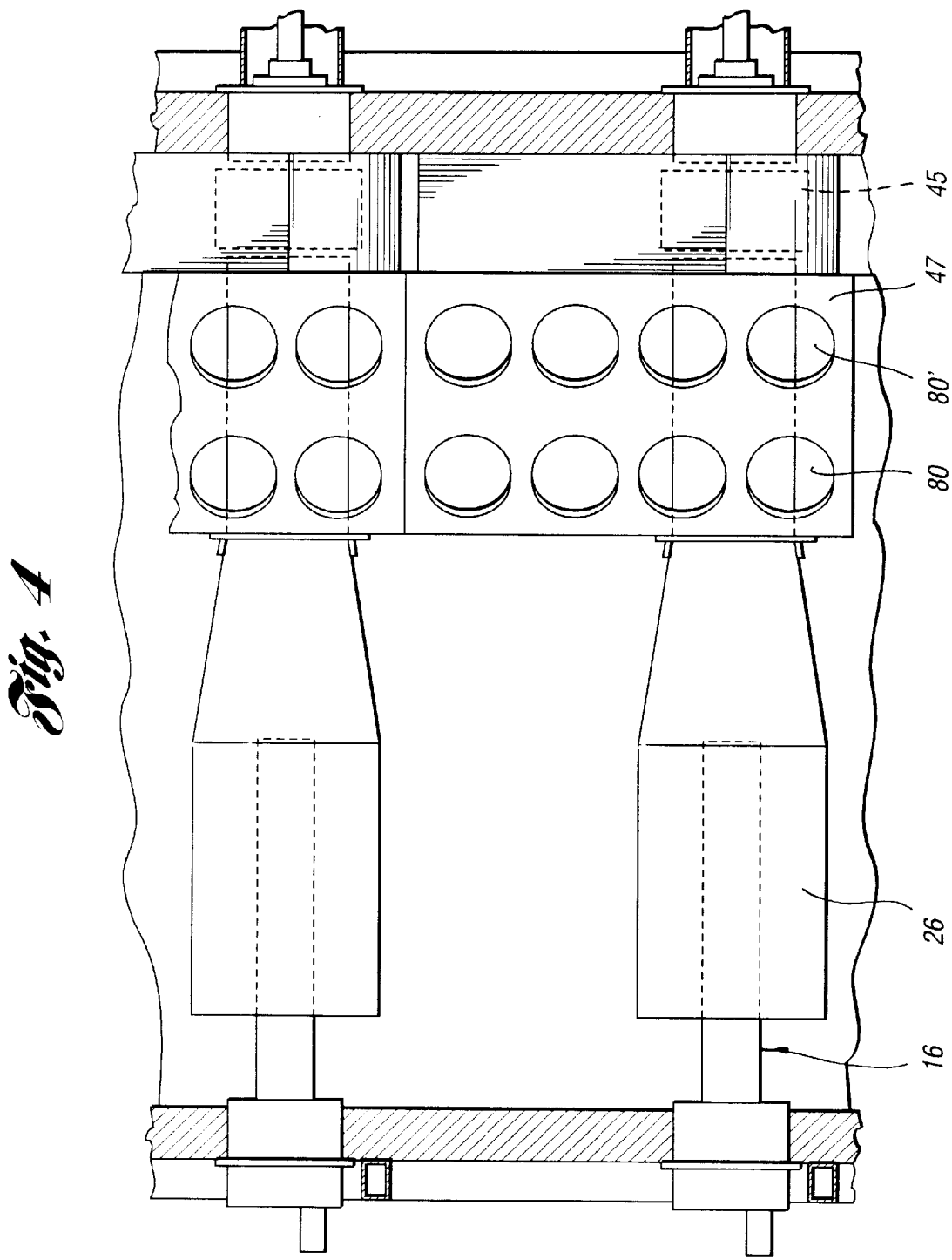

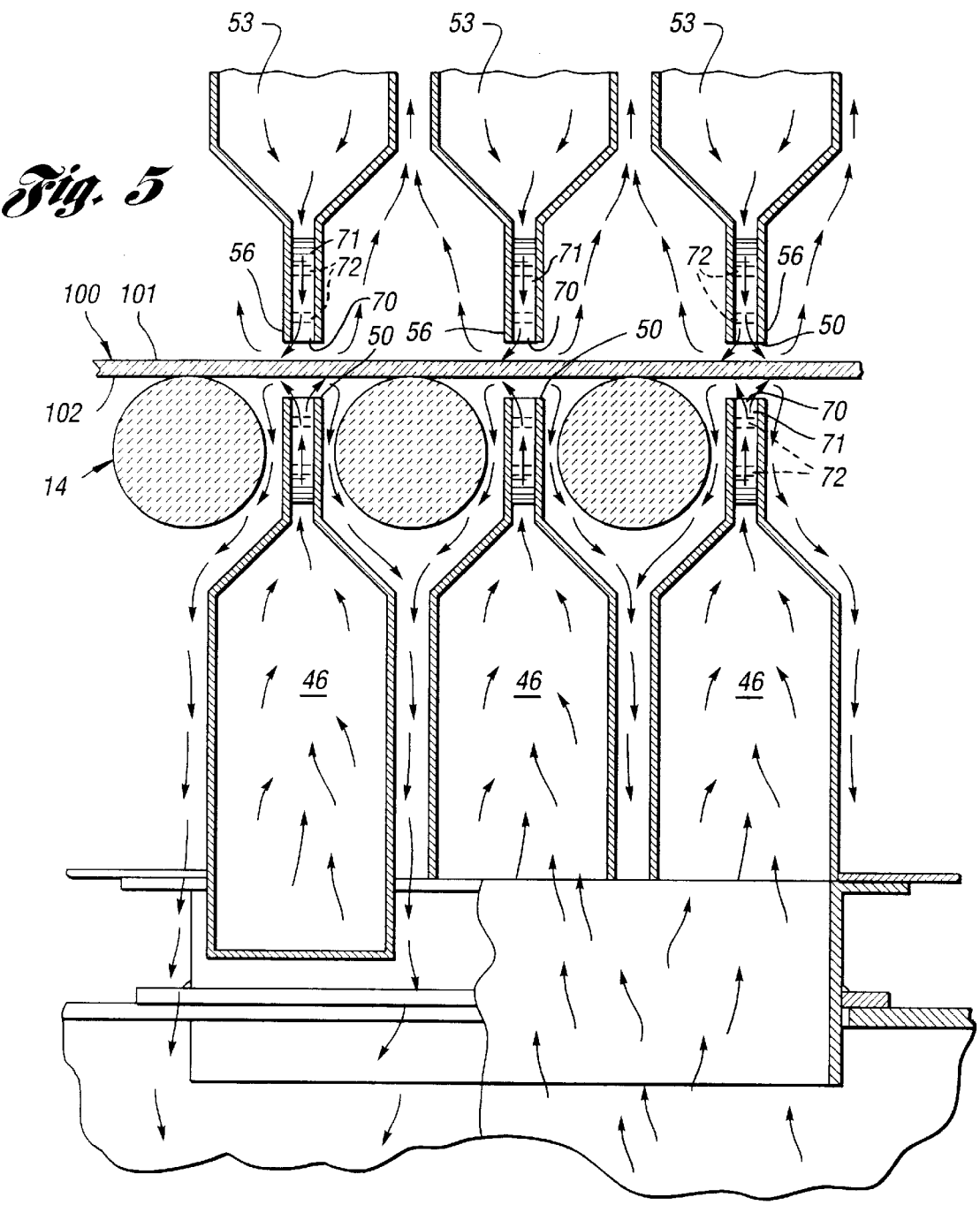
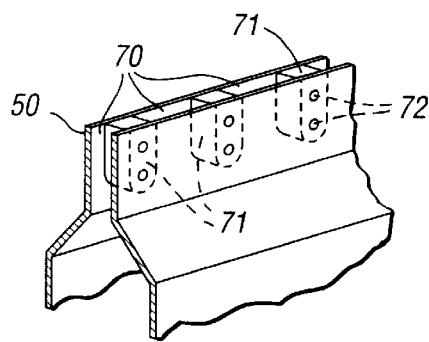

FORCED CONVECTION HEATING APPARATUS AND PROCESS FOR HEATING GLASS SHEETS THEREWITHIN

TECHNICAL FIELD

The present invention relates to a gas-fired forced convection heating apparatus and process for heating glass sheets therewithin.

BACKGROUND ART

Heating of glass sheets in a gas-fired forced convection furnace has been known in the art for several years. Indeed, one such type of prior art gas-fired furnace conveys a sheet of glass through the furnace on a bed of air. As the glass "floats" through the furnace, hot air is distributed toward and into contact with the top and bottom surfaces of the glass sheet. However, due to the complexity of a "floating" system, prior art devices of this type typically use convective heat flow to the bottom surface of the glass sheet, and radiant heat flow to the top surface of the glass sheet.

After the heated working fluid has impinged the bottom surface of the glass sheet, a portion of the "spent" working fluid is randomly returned toward a proximally positioned gas burner where the spent working fluid and newly produced products of combustion are mixed and then recirculated toward impingement of same on the glass sheet.

Furthermore, prior art gas-fired heating devices have also been used in which convective heat that is to impinge upon the top surface of a glass sheet is distributed from one or more gas burners located above the glass sheet as it passes through the device, and, convective heat that impinges the bottom surface of the glass sheet is distributed by one or more gas burners located below the glass sheet.

However, existing gas-fired convection heating systems cannot provide the capability of separately controlling the velocity of impingement of the working fluid with the surface of the glass sheet to be heated, independent from control of the heat input to the system.

In addition, none of such prior art devices disclose, much less suggests, the use of gas-fired burners operably positioned above and below the glass sheet for producing and, in turn, distributing, forced convective flow of the hot working fluid to corresponding ones of the top and bottom surfaces of the glass sheet in which: (1) the heat input to and, consequently, the temperature of, the working fluid above and below the glass sheet may be controlled independently; and/or (2) the impingement velocity of the hot working fluid being distributed onto the top and bottom surfaces of the glass sheet can be independently controlled—toward uniform control of convection heat transfer to the top and bottom surfaces of the glass sheet, to, in turn, compensate for glass thickness, coating and color, among other variables.

And, although such prior art devices have indeed disclosed recirculation of spent working fluid and use of gas-fired burners, none of such prior art devices disclose, much less suggests, drawing spent hot working fluid toward and into a mixing chamber operably and closely positioned about a substantial portion of a gas burner—in which the gas burner is specifically intended to produce, for distribution, hot combustion gases to the respective top and/or bottom surfaces of the glass sheet being heated.

These and other features of the present invention will become apparent because of the present specification, claims and drawings.

DISCLOSURE OF INVENTION

The present invention relates to a gas-fired forced convection heating apparatus for heating glass sheets, in which the glass sheets each have a top surface and a bottom surface. The apparatus comprises a housing having an interior region, and a conveyor for conveying a glass sheet through the interior region of the housing. At least one gas burner is operably associated with the housing for producing hot combustion gases, thereby providing a heat input to the apparatus. An adjustor is operably connected to, and controls, the inputs to the gas burner to vary the heat input and, thereby, maintain the temperature of the working fluid at a preselected set point.

The forced convection heating apparatus further comprises a mixing chamber operably positioned about at least a portion of the gas burner means. The mixing chamber includes a proximal end operably associated with the first and second distributing means, and a second open end distally spaced from the proximal end.

The apparatus further includes a director for directing spent hot working fluid, which has impinged upon at least one of the top and bottom surfaces of the glass sheet, toward and into the mixing chamber for operable mixing of at least a portion of the spent hot working fluid with newly produced hot gaseous products of combustion from the gas burner toward transfer of same into at least one of the first and second distributors and, in turn, toward and into operable contact with at least one of the top and bottom surfaces of the glass sheet within the interior region of the housing.

The apparatus further includes a velocity control for controlling the impingement velocity of the hot working fluid toward and into contact with the surfaces of the glass sheet independently of the operation of the adjustor for the gas burner. It will be appreciated that, since the rate of convective heat exchange at the glass sheet surface is a function of the impingement velocity of the working fluid, the velocity control provides control of the rate of convective heat transfer to the glass sheet independent of control (via the adjustor) of the heat input into the system.

The apparatus further includes a distributor for distributing, and, in turn impinging, a working fluid including at least a portion of the hot combustion gases from the gas burner to the surface of the glass sheet.

In one embodiment, the distributor includes a first distributor for distributing to the bottom surface of the glass sheet within the interior region of the housing, as well as a second distributor for distributing, and, in turn, impinging at least a portion of the hot combustion gases from the gas burner means to the top surface of the glass sheet within the interior region of the housing. Similarly, a first temperature adjustor is also incorporated for adjusting the temperature of the working fluid prior to impingement of same onto the bottom surface of the glass sheet, and, a separate second temperature adjustor is incorporated for adjusting the temperature of the working fluid prior to impinging of same onto the top surface of the glass sheet. These first and second adjustors being operable, and, in turn, adjustable, independently of each other.

In one embodiment of the invention, the velocity control further comprises a first velocity control for controlling impingement velocity of the hot working fluid toward and into contact with the bottom surface of the glass sheet within the interior region of the housing, and, a second velocity control for controlling impingement velocity of the working fluid toward and into contact with the top surface of the glass sheet. The first and second velocity controls being operable, and, in turn, controllable, independently of each other.

In one embodiment of the invention, the forced convection heating apparatus further comprises a mixer for causing a mixture of the spent hot working fluid and the newly produced hot combustion gases within the mixing chamber. The mixer comprises a plurality of apertures integrally formed in the gas burner means for release of the hot combustion gases in a direction substantially perpendicular to the longitudinal axis of the gas burner means. The spent hot working fluid is then operably drawn into the mixing chamber in a direction substantially perpendicular to the hot combustion gases as it is being operably released from the gas burner means to, in turn, result in a mixture of the spent working fluid and newly produced hot gaseous products of combustion.

Also in one embodiment of the invention, the working fluid director includes at least one fan operably associated with the mixing chamber for drawing at least a portion of the spent hot working fluid that has impinged upon at least one of the top and bottom surfaces of the glass sheet within the interior region of the housing toward and into the mixing chamber. It is also preferred that the first and second distributors each include at least one fan and at least one working fluid conduit member operably associated with a corresponding one of the at least one fan. Each of the working fluid conduit members has at least one nozzle member operably positioned adjacent a corresponding one of the top and bottom surfaces of the glass sheet within the interior region of the housing for operably distributing, and, in turn, impinging at least a portion of the hot combustion gases toward and onto the adjacent top and bottom surfaces of the glass sheet.

The first and second working fluid distributors each include a plenum member operably positioned between corresponding ones of the fan and hot working fluid conduit member.

The preferred embodiment of the invention also includes a process for heating a sheet of glass in a gas-fired forced convection heating apparatus, in which the apparatus includes a housing having an interior region and the glass sheet has a top and bottom surface.

The system of the present invention also preferably includes at least one exhaust stack including an adjustable damper to allow for control of the rate of exhaust of the working fluid from the system to provide a balanced pressure at the conveyor roller seats, the glass sheet entrance, and glass sheet exits of the furnace and, thus, prevent the influx of cooler ambient air from the factory environment into the furnace.

The process comprises the steps of: (a) inserting a glass sheet into the interior region of the housing; (b) inputing heat to the apparatus by producing hot gaseous products of combustion from at least one gas burner; (c) mixing the hot gaseous products of combustion with a working fluid; (d) distributing the working fluid into operable contact with at least a portion of the surfaces of the glass sheet within the interior region of the housing; (e) monitoring the temperature of the working fluid; (f) adjusting the heat input to the system to maintain the temperature of the working fluid at a preselected set point; and (g) adjusting the impingement velocity of the working fluid to thereby adjust the rate of convective heat exchange at the glass sheet surface. The adjusting of the impingement velocity of the working fluid being independent of adjustment of the temperature of the working fluid.

In one embodiment of the invention, the process further comprises the steps of: (a) adjusting the temperature of the working fluid which is to be distributed toward and into contact with the bottom surface of the glass sheet; and (b) adjusting the temperature of the working fluid that is to be distributed toward and into operable contact with the top surface of the glass sheet. The adjusting of the temperatures of the hot working fluid which is being distributed toward and onto the top and bottom surfaces, respectively, of the glass sheet, being adjustable independently of each other.

In one embodiment of the invention, the process for heating a glass sheet within a forced convection heating apparatus further comprises the steps of: (a) drawing at least a portion of spent hot working fluid, which has operably contacted at least one of the top and bottom surfaces of the glass sheet, toward and into a mixing chamber operably associated with a corresponding one of the at least one gas burner—in which the mixing chambers are operably positioned about at least a portion of a corresponding one of at least one gas burner; (b) mixing the spent hot working fluid in the mixing chamber with the hot combustion gases being produced from a corresponding one of the at least one gas burner; and (c) distributing the mixed spent hot working fluid and the newly produced hot combustion gases toward and into operable contact with at least one of the top and bottom surfaces of the glass sheet within the interior region of the housing.

In another preferred embodiment of the invention, the process for heating a sheet of glass in a forced convection heating apparatus further comprises the steps of: (a) controlling the impingement velocity of the mixed spent hot working fluid and newly produced hot combustion gases that are to come into contact with the bottom surface of the glass sheet; and (b) controlling the impingement velocity of the mixed spent hot working fluid and newly produced hot combustion gases that are to come into contact with the top surface of the glass sheet. The controlling of the impingement velocity of the mixed fluids that are to come into contact with the top and bottom surfaces, respectively, of the glass sheet, being controllable independently of each other.

BRIEF DESCRIPTION OF DRAWINGS

FIG. 4 of the drawings is a cross-sectional view of the forced convection heating apparatus taken generally along lines 4—4 of FIG. 3;

FIG. 5 of the drawings is a cross-sectional view of an array of the first and second distributing means, showing, in particular, distribution of hot working fluid out of the corresponding nozzles, and, accordingly toward and into contact with the top and bottom surfaces of a glass sheet within the interior region of the housing of the forced convection heating apparatus;

FIG. 6 of the drawings is a perspective view of the nozzles; and

BEST MODE(S) FOR CARRYING OUT THE INVENTION

Figure 7:
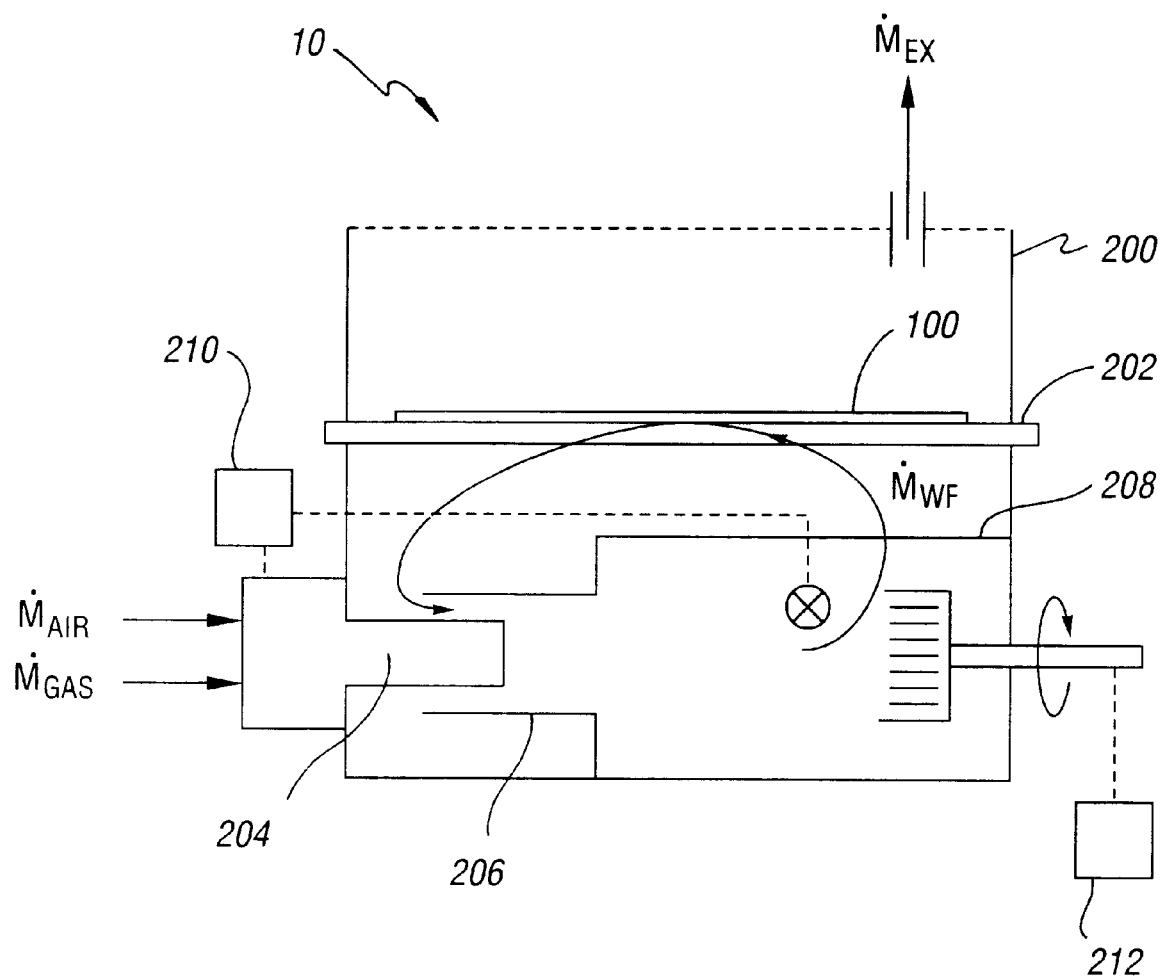
FIG. 7 of the drawings is a schematic view of the apparatus of the present invention.

The gas-fired forced convection heating apparatus 10 of the present invention is schematically illustrated in FIG. 7.

The apparatus includes a housing 200, a conveyor 202, at least one gas burner 204 for creating hot gaseous products of combustion which provide heat input to the apparatus, a mixing chamber 206 for mixing the products of combustion with a working fluid, a distributor 208 for distributing the heated working fluid including at least a portion of the hot products of combustion to a surface of the glass sheet 100 within the interior region of the housing 200, an adjuster 210 for adjusting the level of heat input from the gas burner 204 to maintain the temperature of the working fluid at a preselected set point, and a control 212 for adjusting the velocity of the working fluid prior to impingement of the same on the surface of the glass sheet 100 thereby controlling the rate of convective heat exchange between the working fluid and the glass sheet substantially independently of the control of heat input to the system 10.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

At the outset, although it is contemplated that gas-fired forced convection heating apparatus 10 be constructed with multiple gas burners, related distribution and recirculating assemblies/units, only two of such assemblies/units will be explained in detail—since any additional units would comprise substantially the same components and intercooperation therebetween.

Figure 1:
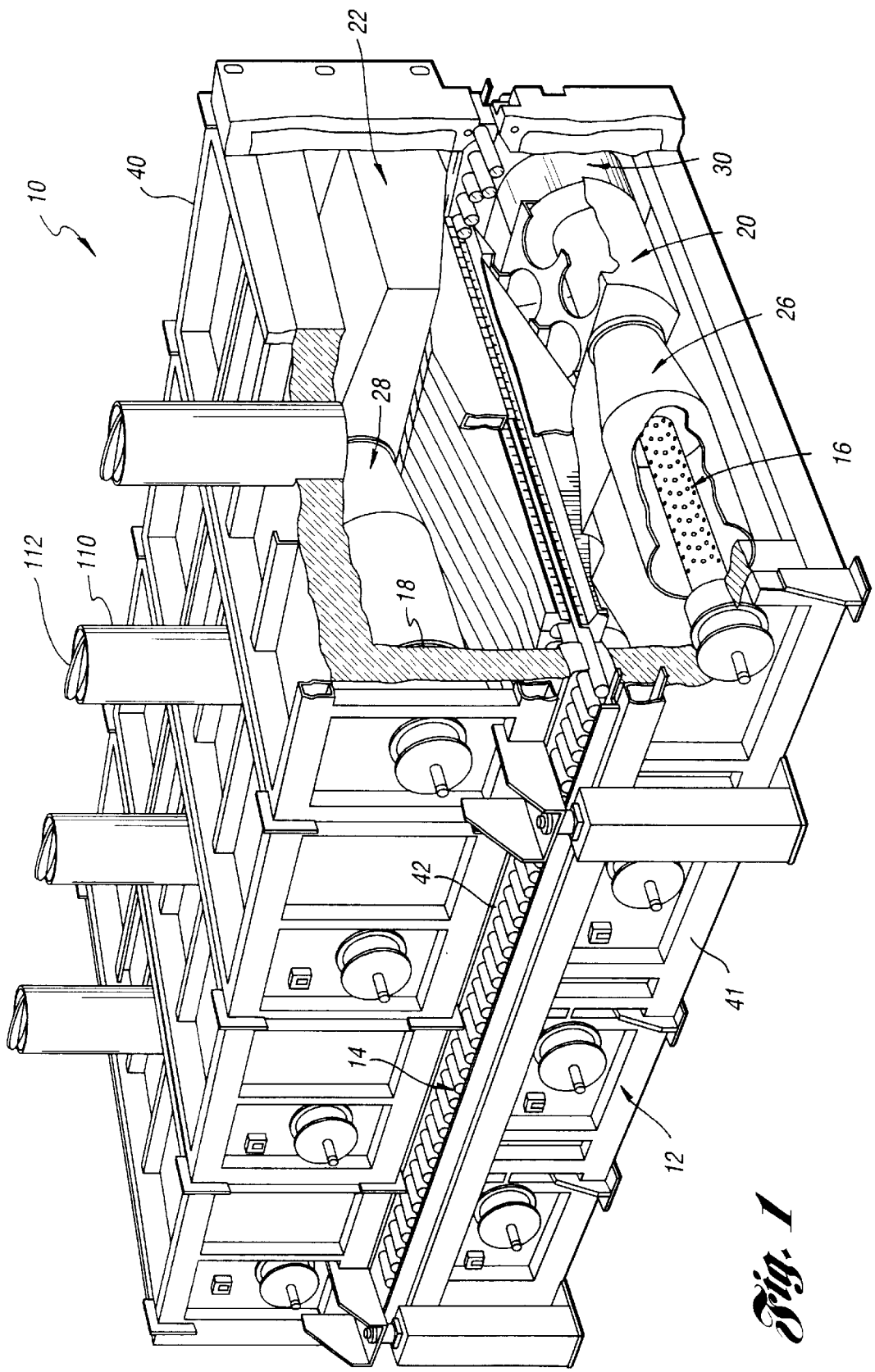
FIG. 1 of the drawings is a perspective view of the forced convection heating apparatus in partial cross-section and in partial break-away.
Figure 3:
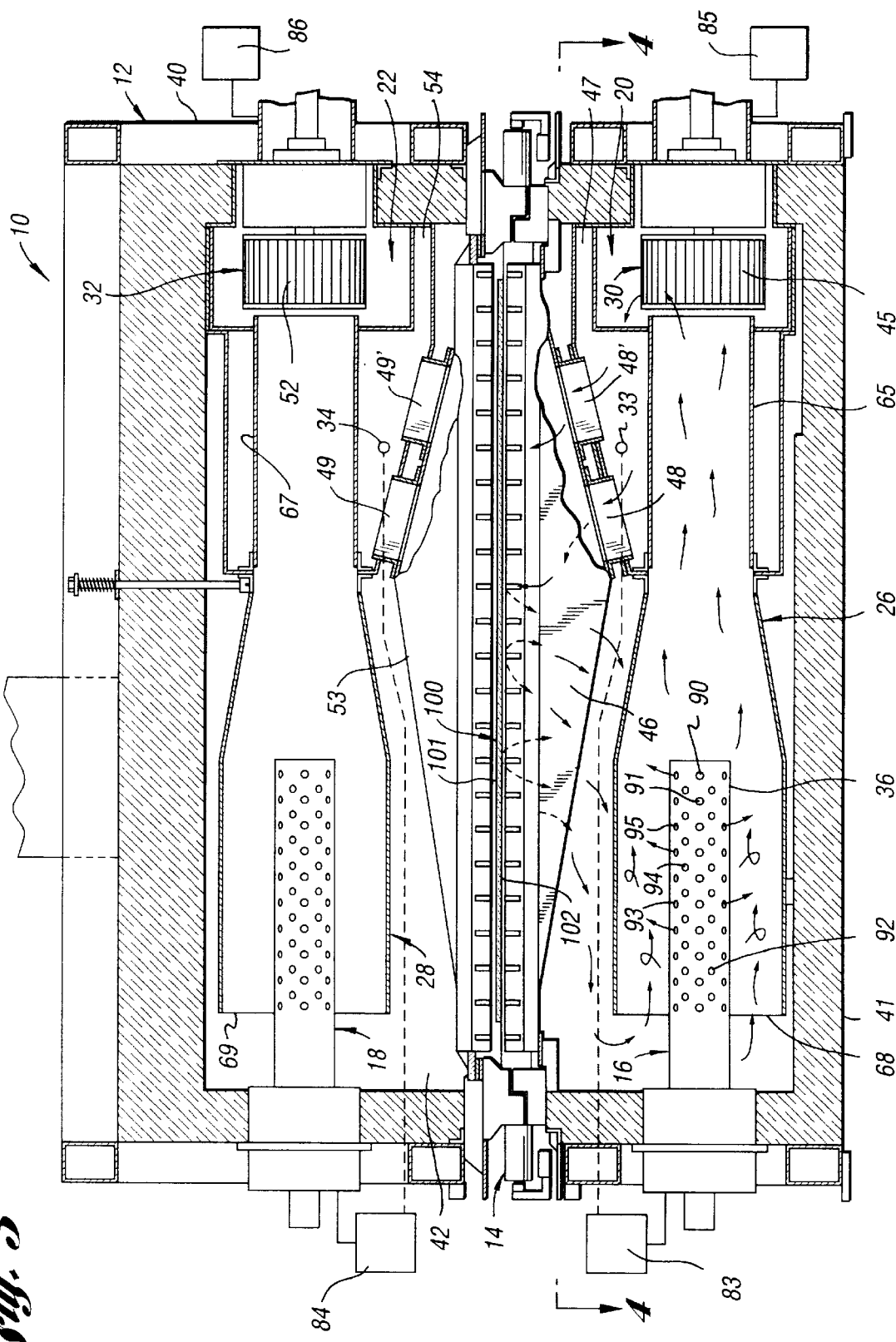
FIG. 3 of the drawings is a cross-sectional view of the forced convection heating apparatus taken generally along lines 3—3 of FIG. 2.

One embodiment of the forced convention heating apparatus 10 is shown in FIG. 1 and FIG. 3 as comprising housing 12, conveyor 14, a first gas burner 16, a second gas burner 18, a first distributor 20, a second distributor 22, a first mixing chamber 26, a second mixing chamber 28, a first director 30, a second director 32 (FIG. 3), a first temperature adjustor 83 (FIG. 3), a second temperature adjustor 84 (FIG. 3), a mixer 36 (FIG. 3) and first and second impingement velocity controls, 85 and 86, respectively.

Figure 2:
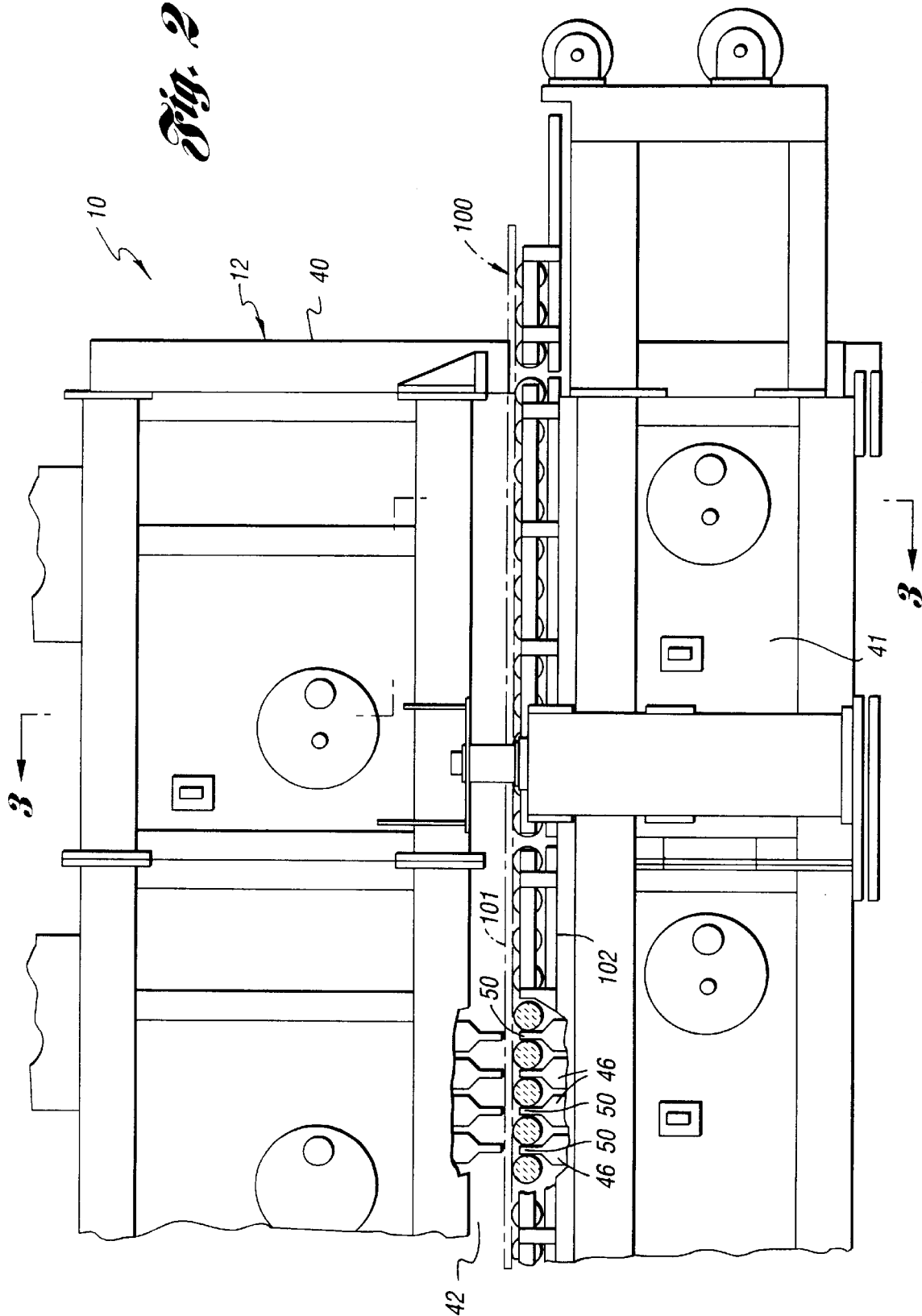
FIG. 2 of the drawings is a side cut-away view of the forced convection heating apparatus.

Housing 12, as shown in FIGS. 1–3, includes upper section 40, lower section 41, and interior region 42. Conveyor 14, which may comprise a plurality of ceramic rollers, is operably positioned between the upper and lower sections of housing 12, and are used to convey a glass sheet, such as glass sheet 100 (FIG. 2 and FIG. 3) through interior region 42 of housing 12. Glass sheet 100 includes top surface 101 and bottom surface 102. As can be seen in FIG. 2 and FIG. 3, when glass sheet 100 is operably positioned within interior region 42 of housing 12, top surface 101 will be operably exposed to upper section 40 of housing and bottom surface 102 will be operably exposed adjacent lower section 41 of housing 12.

First distributor 20 is shown in FIG. 3 as comprising fan 45, working fluid conduit 46, and plenum member 47. Working fluid conduit 46 includes a plurality of male insert members, such as male insert member 48, 48' (FIG. 3) which are operably seated within corresponding receptacles, such as receptacles 80, 80' (FIG. 4) of the corresponding plenum member 47 (FIG. 4), and a plurality of nozzles, or jets, 50 (FIG. 5). As will be explained in greater detail, nozzles 50 comprise a passage 70 (FIG. 6), for operable release of hot working fluid, toward and into contact with bottom surface 102 of glass sheet 100. Nozzle 50 is comprised of two parallel plates spaced apart by separators 71 and held together by fasteners 72. It is conceivable that different other types of embodiments of this structure are possible including nozzles that distribute the hot combustion gases in a radial arc, and stamped half nozzles assembled in such a way as to provide a set of flow passages defining the nozzles.

Second distributor 22 is also shown in FIG. 3 as including fan 52, working fluid conduit 53, and plenum member 54. Working fluid conduit 53 of the second distributing means also includes a plurality of male insert members 49, 49' (FIG. 3) for operable insertion into corresponding receptacles (not shown) of plenum member 54, and nozzles (FIG. 5). These nozzles, like nozzles 50 of first distributing means 20, enable hot combustion gases produced from a corresponding gas burner means 18 (FIG. 3) to be released toward and into operable contact with to surface 101 of glass sheet 100.

First mixing chamber 26 and second mixing chamber 28 are shown in FIG. 3 and FIG. 4. As can be seen, first mixing chamber 26 is operably positioned about a portion of first gas burner means 16, and second mixing chamber 28 is operably positioned about a portion of second gas burner means 18. Both the first and second mixing chambers 26 and 28, respectively, include a proximal end 65 and 67, respectively, and an open end 68 and 69, respectively—in which the proximal ends are operably positioned adjacent a corresponding fan, such as fans 45 and 52 (FIG. 3).

The fans, such as fans 45 and 52, which, among other things, serve to distribute hot combustion gases from the respective gas burner means toward and into eventual contact with the glass sheet, also serve as part of the directing means for drawing spent hot working fluid that has impinged on the top and bottom surfaces 101 and 102, respectively, of glass sheet 100, toward and into a corresponding one of the first and second mixing chambers 26 and 28, respectively (as shown by the direction of the arrows in FIG. 3). First and second directors 30 and 32, respectively, each use fans 45 and 52, respectively, for drawing spent hot working fluid into a corresponding mixing chamber.

As the spent hot working fluid is drawn into the respective mixing chambers, the spent working fluid and the newly produced hot combustion gases are mixed because of mixer 36 (FIG. 3). As can be seen in FIG. 3, the mixer comprises a plurality of apertures, such as apertures 90–95 integrally formed through each of the gas burner, such as gas burner 16 and 18 coupled with the substantially parallel flow of the spent hot working fluid, relative to the longitudinal axis of the respective gas burner, as it enters into the mixing chamber. Accordingly, since the newly produced hot products of combustion are being released through apertures, such as apertures 90–95, in a direction substantially perpendicular to the longitudinal axis of the gas burner, the spent hot working fluid being drawn into the mixing chamber will, in effect, collide with the newly released hot combustion gases, to, in turn, result in a mixture of spent and newly produced hot combustion gases.

First and second adjustors 83 and 84, respectively, are shown in FIG. 3 as comprising controls connected to thermocouples 33 and 34—although any other type of conventional mechanism for altering the temperature of the hot combustion gases to be produced, or after it is produced, from a corresponding one of the gas burner means, is also contemplated for use. As will be explained, each of the adjustors independently controls the heat input, preferably by controlling the air and gas input to one of the gas burners.

First and second impingement velocity controls are shown in FIG. 3, in which impingement velocity of the hot working fluid being distributed toward and into the top and bottom surfaces of the glass sheet is independently controlled by adjusting the speed on the shaft of fans, such as shafts of fans 45 and 52. Such controls enable the impingement velocity of the hot combustion gases being directed toward and into contact with the top surface of the glass sheet to be adjusted independently, and, in turn, at a different velocity than the hot working fluid being directed toward and into the bottom surface of the glass sheet—if so desired.

In operation, glass sheet 100 is inserted within interior region 42 of housing 12 through a glass sheet insertion inlet (not shown), and transfer of the glass sheet through the interior region of the housing is accomplished by conveying means 14. Although the conveying means may comprise ceramic rollers, other types of rollers or other conventional conveying mechanisms are also contemplated for use.

As glass sheet 100 is being conveyed through housing 12, top surface 101 will be operably exposed adjacent a portion of second distributor 22, and more particularly, adjacent the array of nozzles in working fluid conduit 53 (as shown in FIG. 5). Accordingly, bottom surface 102 of glass sheet 100 will be operably positioned adjacent a portion of first distributor 20, and more particularly, adjacent the array of nozzles 50 of working fluid conduit 46. As can be seen in FIG. 2 and FIG. 5, each of the nozzles 50 of working fluid conduit 46, of first distributor 20, are operably positioned between the individual rollers of conveying means 14. Such an orientation facilitates relatively unobstructed impingement of the hot working fluid toward and onto bottom surface 102 of glass sheet 100.

In addition, as glass sheet 100 is being conveyed through housing 12, each of the gas burner means, such as gas burner means 16 and 18, respectively, in combination with each mixing chamber 26 and 28 will be producing hot working fluid at a desired temperature. Since the sheet of glass to be heated may be of a type different than that of a sheet of glass previously heated in apparatus 10 (e.g., different glass colors, surface treatments and/or thicknesses, among other variables), it is important to note that the temperature of the hot working fluid being produced from each of the respective gas burner means, in combination with each mixing chamber and the impingement velocity of same, can be controlled independently of each other (by the corresponding temperature adjustors and impingement velocity controls). Moreover, this embodiment of the system provides for independent control of convection heat transfer to the top and bottom surfaces 101 and 102, respectively, of the specific glass sheet 100 being heated. Indeed, such independent controlling of heat input and rate of convective heat transfer, as well as independent controlling of each of these parameters on the top and bottoms of the glass sheets, provides more precise control of the glass sheet heating process and enables different types of glass sheets to be processed at a substantially constant rate within apparatus 10—without the necessity of altering the speed at which the glass is conveyed through the apparatus.

As the hot combustion gases are being produced from the gas burner means, 16 and 18 it will be released from the apertures therein, and then will flow in the direction of the arrows, as shown in FIG. 3. The hot combustion gases will mix with the spent hot working fluid returning through apparatuses 68 and 69, producing new hot working fluid. As previously explained, such a flow pattern will occur because of corresponding fans 45 and 52, respectively. The new hot working fluid enters the first and second distributors 20 and 22 by the action of fans 45 and 52 respectively. The hot working fluid will then continue to travel through the respective working fluid conduits until it is released through corresponding nozzles, such as nozzles 50 and 56, where the hot combustion gases will then impinge upon the adjacently positioned top and bottom surfaces 101 and 102, respectively, of glass sheet 100—toward operable heating of same.

After the newly produced hot working fluid has impinged the glass sheet, the fluid that has impinged top surface 101 of glass sheet 100 will, in effect, move away from the surface, and this spent hot working fluid will then be drawn into second mixing chamber 28. Similarly, the working fluid gases that have impinged bottom surface 102 of glass sheet 100, will also move away from the surface and, in turn, be drawn into first mixing chamber 26—as shown by the direction of the arrows in FIG. 3 and FIG. 5.

As previously explained, the spent hot working fluid as well as the relatively high temperature gases of the newly produced hot products of combustion from the associated gas burner, such as gas burner 16 are drawn into the respective mixing chambers because of suction caused by the corresponding fans, such as fan 45. As also previously explained, the spent hot working fluid and the newly produced hot combustion gases mix within the respective mixing chambers to, in turn, result in a substantially uniform mixture of the fluids for further, recirculated, distribution of the heated working fluid to the respective top and bottom surfaces of the glass sheet.

Referring again to FIG. 1, the apparatus 10 of the present invention preferably includes at least one exhaust stack 110 connected to chamber 42. The exhaust stack 42 includes an adjustable damper 112 for controlling the rate of exhaust of combustion products from the system. By adjusting the damper 112 on each of the exhausts 110 to a pre-selected position, the flow rate of the exhaust through the stacks can be controlled to provide balanced, or, preferably slightly positive pressure in the system. This balanced or slightly positive pressure reduces drafts which would otherwise result from the influx of ambient air through openings in the furnace, such as at the entrance, exit, or at the conveyor roll seals. This reduction or elimination of unwanted influx of cooler air allows for better and more efficient control of the temperature throughout the heated environment.

The description and drawings merely explain and illustrate the invention and the invention is not limited thereto except because the appended claims are so limited as those skilled in the art who have the disclosure before them can make modifications and variations therein without departing from the scope of the invention.

What is claimed is:

1. A gas-fired forced convection heating apparatus for heating glass sheets, wherein the glass sheets each have a top surface and a bottom surface, the forced convection heating apparatus comprising:

a housing having an interior region;

a conveyor for conveying a glass sheet through the interior region of the housing;

at least one gas burner operably associated with the housing for producing hot products of combustion providing a heat input to the apparatus; an adjustor operably associated with the gas burner for adjusting the level of heat input from the gas burner to the apparatus;

a mixing chamber for mixing the hot products of combustion with working fluid recirculated within the housing;

a distributor for distributing, and, in turn, impinging, the working fluid including at least a portion of the hot products of combustion from the gas burner to a surface of a glass sheet within the interior region of the housing; and a velocity control for adjusting the impingement velocity of the working fluid on the surface of the glass sheet, thereby controlling the rate of convective heat exchange between the working fluid and the glass sheet substantially independently of controlling the heat input to the apparatus.

2. The invention according to claim 1 wherein the distributor further comprises a first distributor for distributing and, in turn, impinging a portion of the working fluid to the bottom surface of the glass sheet, and a second distributor for distributing, and, in turn, impinging, a portion of the working fluid to the top surface of the glass sheet.

3. The invention according to claim 1 wherein the velocity control further comprises:

a first velocity control for controlling impingement velocity of the working fluid toward and into contact with the bottom surface of the glass sheet, and a second velocity control for controlling impingement velocity of the working fluid toward and into contact with the top surface of the glass sheet, the first and second impingement velocity controls each being operable, and, in turn, controllable, independent of each other.

4. The invention according to claim 1 wherein the adjustor comprises a first temperature control for maintaining the temperature of the working fluid at a first preselected set point prior to impingement of same on the bottom surface of the glass sheet, and a second temperature control for maintaining the temperature of the working fluid at a second preselected set point prior to impingement of same on the top surface of the glass sheet.

5. The invention according to claim 1 wherein the mixing chamber is operably positioned about at least a portion of the gas burner, and wherein the mixing chamber includes a proximal end operably associated with the first and second distributors, and a second open end distally spaced from the proximal end; and a director for directing spent hot working fluid, which has impinged upon at least one of the top and bottom surfaces of the glass sheet, toward and into the mixing chamber for operable mixing of at least a portion of the spent hot working fluid with newly produced hot combustion gases from the gas burner toward transfer of same into at least one of the first and second distributors and, in turn, toward and into operable contact with at least one of the top and bottom surfaces of the glass sheet within the interior region of the housing.

6. The invention according to claim 5 wherein the forced convection heating apparatus further includes a mixer for causing a mixture of the spent hot working fluid and the newly produced hot combustion gases within the mixing chamber.

7. The invention according to claim 6 wherein the gas burner means includes a longitudinal axis, and the mixer comprises:

a plurality of apertures integrally formed in the gas burner means for release of the hot combustion gases in a direction substantially perpendicular to the longitudinal axis of the gas burner means; and the spent hot working fluid being operably drawn into the mixing chamber in a direction substantially perpendicular to the hot combustion gases as it is being operably released from the gas burner to, in turn, result in a mixture of the spent working fluid and newly produced hot combustion gases.

8. The invention according to claim 5 wherein the directing means include at least one fan operably associated with the mixing chamber for drawing at least a portion of the spent hot working fluid which has impinged upon at least one of the top and bottom surfaces of the glass sheet within the interior region of the housing toward and into the mixing chamber.

9. The invention according to claim 2 wherein the first distributor and the second distributor each include at least one fan and at least one hot working fluid conduit member operably associated with a corresponding one of the at least one fan;

each of the at least one hot working fluid conduit members having at least one nozzle member operably positioned adjacent a corresponding one of the top and bottom surfaces of the glass sheet within the interior region of the housing for operably dispensing, and, in turn, impinging at least a portion of the hot combustion gases toward and onto the adjacent top and bottom surfaces of the glass sheet.

10. The invention according to claim 9 wherein the first and second distributors each include a plenum member operably positioned between corresponding ones of the at least one fan and the at least one hot working fluid conduit member.

11. The forced convection heating apparatus of claim 1 wherein the at least one gas burner comprises first and second gas burners;

the distributor comprises a first distributor for distributing, and, in turn, impinging, the hot combustion gases from the first gas burner to the bottom surface of the glass sheet within the interior region of the housing, and a second distributor for distributing, and, in turn, impinging, the hot combustion gases from the second gas burner means to the top surface of the glass sheet within the interior region of the housing; and the adjustor further comprises a first adjustor for adjusting the level of heat input from the gas first burner, and a second adjustor for adjusting the level of heat input to the second gas burner, the first and second adjustors being adjustable independent of each other.

12. The invention according to claim 11 wherein the forced convection heating apparatus further comprises:

a first mixing chamber operably positioned about at least a portion of the first gas burner means;

a second mixing chamber operably positioned about at least a portion of the second gas burner means;

the first and second mixing chambers each having a proximal end operably associated with a portion of a corresponding one of the first and second distributing means, and a second open end distally spaced from the proximal end;

a first director for directing spent working fluid, which has impinged upon the bottom surface of the glass sheet, toward and into the first mixing chamber for operable mixing of at least a portion of the spent working fluid with newly produced hot combustion gases from the first gas burner toward transfer of same into the first distributor and, in turn, toward and into operable contact with the bottom surface of the glass sheet within the interior region of the housing; and a second director for directing spent working fluid, which has impinged upon the top surface of the glass sheet, toward and into the second mixing chamber for operable mixing of at least a portion of the spent working fluid with newly produced hot combustion gases from the second gas burner toward transfer of same into the second distributor and, in turn, toward and into operable contact with the top surface of the glass sheet within the interior region of the housing.

13. The invention according to claim 12 wherein the convection heating apparatus further comprises a mixer for causing a mixture of the spent hot working fluid and the newly produced hot combustion gases within each of the first and second mixing chambers.

14. The invention according to claim 12 wherein:

the first director includes at least one fan operably associated with the first mixing chamber for drawing at least a portion of the spent hot working fluid which has impinged upon the bottom surface of the glass sheet within the interior region of the housing toward and into the first mixing chamber; and the second director includes at least one fan operably associated with the second mixing chamber for drawing the spent hot working fluid which has impinged upon the top surface of the glass sheet within the interior region of the housing toward and into the second mixing chamber.

15. The invention according to claim 11 wherein the forced convection heating apparatus further comprises:

a first velocity control for controlling impingement velocity of the hot working fluid toward and onto the top surface of the glass sheet within the interior region of the housing;

a second velocity control for controlling impingement velocity of the hot working fluid toward and onto the bottom surface of the glass sheet within the interior region of the housing; and the first and second velocity controls being controllable independent of each other.

16. The invention according to claim 11 wherein the first and second adjustors each include at least one thermocouple operably associated with a corresponding one of the first and second gas burner means.

17. The invention according to claim 11 wherein the first distributor and the second distributor each include at least one fan and at least one working fluid conduit member operably associated with a corresponding one of the at least one fan;

each of the at least one working fluid conduit member having at least one nozzle member operably positioned adjacent a corresponding one of the top and bottom surfaces of the glass sheet within the interior region of the housing for operably dispensing, and, in turn, impinging the working fluid toward and onto the adjacent top and bottom surfaces of the glass sheet.

18. The invention according to claim 1 wherein the forced convection heating apparatus further comprises at least one exhaust stack operably connected to exhaust combustion products from the system, each of the exhaust stacks including an adjustable damper for controlling the flow rate of the exhaust through the stacks.

19. A process for heating a sheet of glass in a forced convection heating apparatus, wherein the apparatus includes a housing having an interior region and the glass sheet has a top and bottom surface, the process comprising the steps of:

inserting a glass sheet into the interior region of the housing;

producing hot combustion gases from at least one gas burner;

adjusting the rate of production of hot combustion gases from at least one gas burner, thereby adjusting the rate of heat input to the apparatus;

distributing the hot combustion gases from the at least one gas burner toward and into operable contact with at least a portion of the top and bottom surfaces of the glass sheet within the interior region of the housing; and adjusting the impingement velocity of the hot combustion gases on the surface of the glass sheet, thereby controlling the rate of convective heat exchange between the hot combustion gases and the glass sheet substantially independently of controlling the heat input to the apparatus.

20. The invention according to claim 19 wherein the process further comprises the steps of:

adjusting the temperature of the portion of the hot combustion gases which are to be distributed toward and into contact with the bottom surface of the glass sheet; and adjusting the temperature of the portion of the hot combustion gases which are to be distributed toward and into operable contact with the top surface of the glass sheet, the adjusting of the temperature of the hot combustion gases which is being distributed toward and into contact with the top and bottom surfaces, respectively, of the glass sheet, being adjustable independently of each other.

21. The invention according to claim 19 wherein the process for heating a glass sheet within a forced convection heating apparatus further comprises the steps of:

drawing at least a portion of spent working fluid, which has operably contacted the at least one of the top and bottom surfaces of the glass sheet, toward and into a mixing chamber operably associated with a corresponding one of the at least one gas burner;

each of the mixing chambers being operably positioned about at least a portion of a corresponding one of the at least one gas burner;

mixing the spent working fluid in the mixing chamber with the hot combustion gases being produced from a corresponding one of the at least one gas burner; and distributing the mixed spent working fluid and the newly produced hot combustion gases toward and into operable contact with at least one of the top and bottom surfaces of the glass sheet within the interior region of the housing.

22. The invention according to claim 19 wherein the process further comprises the steps of:

controlling the impingement velocity of the working fluid which is to come into contact with the bottom surface of the glass sheet; and controlling the impingement velocity of the working fluid which is to come into contact with the top surface of the glass sheet, the controlling of the impingement velocity of the portions of working fluid which are to come into contact with the top and bottom surfaces, respectively, of the glass sheet, being controllable independently of each other.

23. The invention according to claim 19 wherein the process further comprises the steps of:
- producing hot combustion gases from a first gas burner;
- producing hot combustion gases from a second gas burner;
- distributing the hot combustion gases from the first gas burner toward and into operable contact with the bottom surface of the glass sheet within the interior region of the housing;
- distributing the hot combustion gases from the second gas burner toward and into operable contact with the top surface of the glass sheet within the interior region of the housing;
- adjusting the temperature of the working fluid which is to be distributed toward and into contact with the bottom surface of the glass sheet; and
- adjusting the temperature of the working fluid which is to be distributed toward and into contact with the top surface of the glass sheet, the adjusting of the temperature of the working fluid which is being distributed toward and into contact with the top and bottom surfaces, respectively, of the glass sheet, being adjustable independently of each other.

* * * * *